July 19, 1966  M. KAPLAN ETAL  3,261,280
COFFEE BREWING MACHINE
Filed Nov. 26, 1963  4 Sheets-Sheet 3
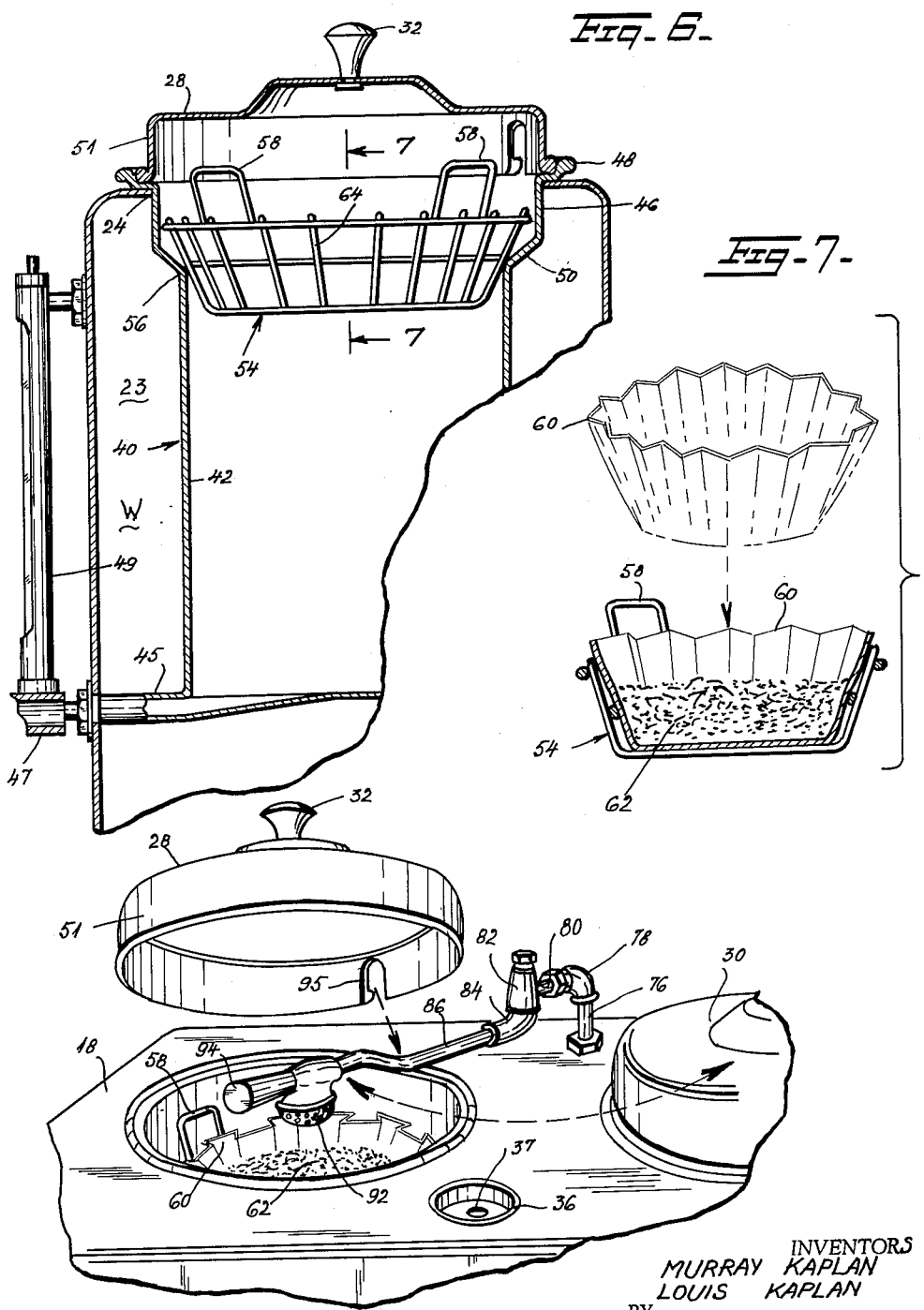
INVENTORS
MURRAY KAPLAN
LOUIS KAPLAN
BY Polachek & Saulsbury
ATTORNEYS.

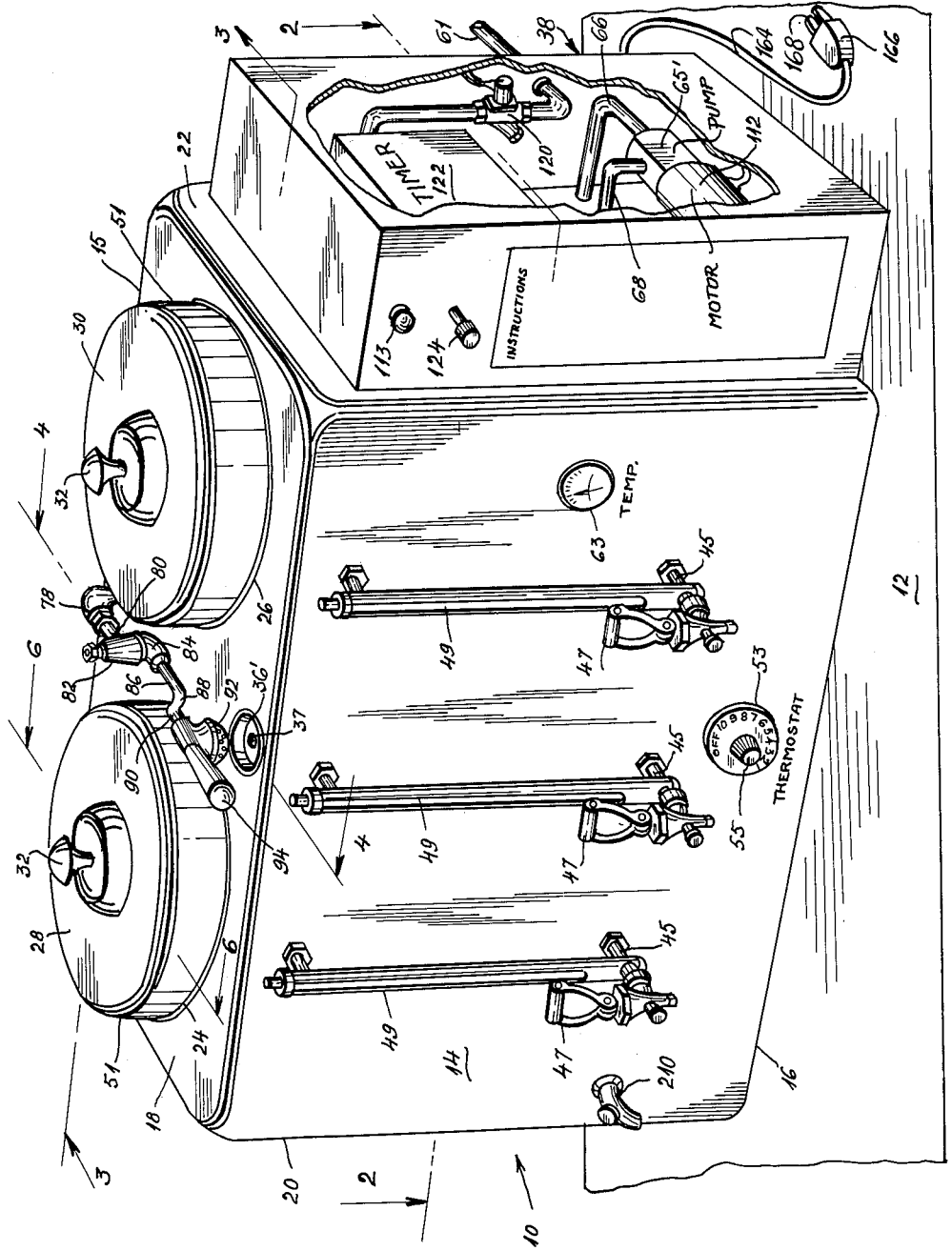

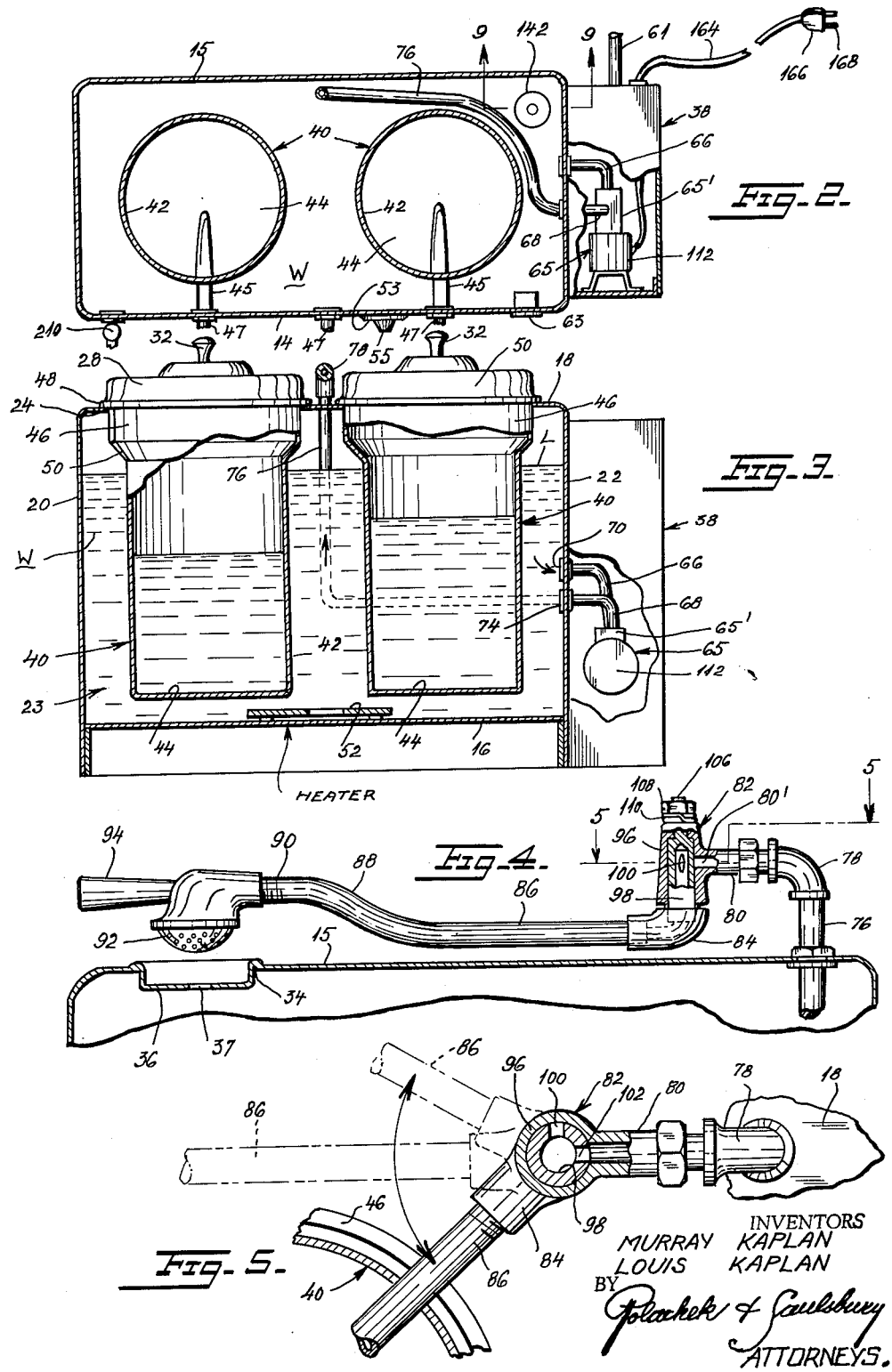

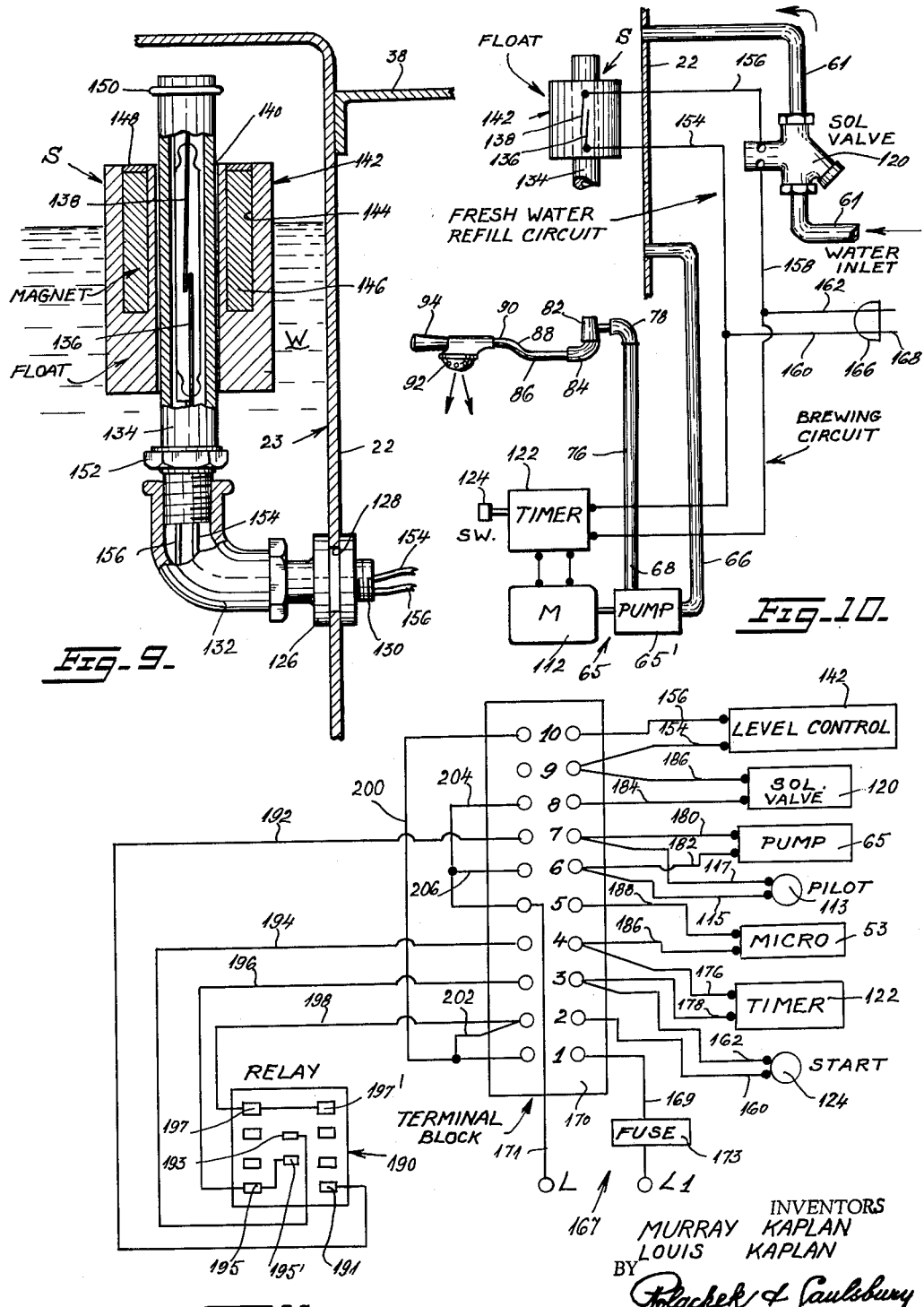

United States Patent Office 3,261,280
Patented July 19, 1966

3,261,280
COFFEE BREWING MACHINE
Murray Kaplan, 61 Warwick Road, and Louis Kaplan,
2 Wimbleton Lane, both of Great Neck, N.Y.
Filed Nov. 26, 1963, Ser. No. 326,102
1 Claim. (Cl. 99—283)

This invention relates to an automatic coffee brewer for bulk brewing of coffee such as are used in restaurants and large eating places.

It is the principal object of the present invention to provide a coffee brewing apparatus that can brew in succession urn full amounts of hot coffee from hot water intermittently supplied from a tank within the apparatus.

Another object of the invention is to provide a brewing apparatus of this kind with a large paper filter adapted to hold a batch of ground coffee.

Still another object of the invention is to provide brewing apparatus of large size with a large removable basket having a large paper lining serving as a throw-away filter.

A further object of the invention is to provide a brewing apparatus of this kind with an automatic float-actuated solenoid controlled valve for controlling the replenishment of the water tank.

A still further object of the invention is to provide a brewing apparatus of this kind with a swingable arm for selectively supplying hot water to one of a pair of urns.

Still further objects of the invention are to provide a coffee brewing apparatus having the above objects in mind, which is of simple construction, has a minimum number of parts, easy to maintain and repair, of pleasing appearance, is sanitary, easy and safe to operate, adapted to be set up for operation from ordinary electric and water supply sources, efficient and automatic in operation.

For further comprehension of the invention and of the objects and advantages thereof, reference will be had to the following description taken in conjunction with accompanying drawings, and to the appended claim in which the various novel features of the invention are more particularly set forth and claimed.

In the accompanying drawings forming a material part of this disclosure:

FIG. 1 is a front perspective view of a coffee brewing apparatus embodying the invention, parts being shown broken away.

FIG. 2 is a horizontal cross-sectional view taken on line 3—3 of FIG. 1, parts being shown broken away.

FIG. 3 is a vertical cross-sectional view taken on the line 3—3 of FIG. 1, parts being broken away.

FIG. 4 is an enlarged vertical sectional view taken on the line 4—4 of FIG. 1, showing the horizontally-extending swingable hot water supply pipe arm.

FIG. 5 is an enlarged fragmentary horizontal sectional view taken on the line 5—5 of FIG. 4 through the pivot joint casting.

FIG. 6 is an enlarged fragmentary vertical sectional view of the apparatus taken on the line 6—6 of FIG. 1.

FIG. 7 is a vertical sectional view taken on the line 7—7 of FIG. 6, the filter being shown in removed condition in dot-dash lines.

FIG. 8 is a fragmentary top perspective view of one end of the top of the main casing, the cover of the urn being shown in displaced lifted condition.

FIG. 9 is an enlarged horizontal sectional view taken on the line 9—9 of FIG. 2.

FIG. 10 shows a wiring diagram with the various piping parts of the apparatus being shown.

FIG. 11 is a schematic wiring diagram of the various parts of the apparatus.

Referring more in detail to the drawings, in FIG. 1, a coffee brewing apparatus made in accordance with the invention is indicated generally at 10. The apparatus is shown resting upon a horizontal supporting surface such as a shelf 12.

The apparatus consists of a main horizontally elongated metal casing, rectangular in configuration and cross section including, as viewed in FIG. 1, a front wall 14, a rear wall 15, bottom wall 16, top wall 18, one end wall 20 and an opposite end wall 22. These walls constitute a hot water tank 23. A pair of circular openings 24 and 26 is formed in the top wall 18 on opposite sides of the center thereof. Inverted dish-shaped metal covers 28 and 30 removably close the openings 24 and 26, respectively. Each cover is provided with a knob 32. An opening 34 is formed in the top wall at its center adjacent the front wall 14 and is closed by a shallow cup-shaped cover 36 having a center hole 37, FIG. 4. A box-like auxiliary casing 38 is secured to the face of the end wall 22 of the main casing.

It is preferred that the main casing be large enough to contain two units of the brewing apparatus so that a supply of coffee may always be ready in one or the other of the units. Accordingly, a pair of spaced urns 40, 40 for brewed coffee are supported by the top wall 18 around the peripheries of the openings 24 and 26 thereof. These urns are formed of stainless steel and each urn consists of a hollow cylindrical body closed at the bottom and open at the top. The top is formed with an enlarged head portion 46 terminating at the open top edge in an annular flange 48 seated on the edge of the respective opening 24 or 26. The head portion and body are joined by a slanting wall portion 50. The edge of flange 51 of the cover, either cover 28 or 30, seats on the flange 48 as seen in FIG. 6. The coffee urns are immersed in hot water W in the tank 23.

Each urn 40 is provided with an outlet pipe 45, FIGS. 2 and 6, leading to the outside of the main casing and secured to the outer end of each outlet pipe is a faucet 47 for withdrawing and dispensing brewed coffee. A glass gauge 49 is connected at its bottom end to each outlet pipe 45 for indicating the level of the brewed coffee in the urn.

A suitable electric heating device 52 is mounted on the bottom of the tank 23 for heating the water W in the tank, FIG. 3. A thermostat 53 having a knob 55 is provided for maintaining the temperature of the water W in tank 23 at a substantially constant or at least within a range of a few degrees up to 205° F., FIG. 1. The tank 23 holds a supply of water W at a predetermined level L. This water W is supplied through and maintained at the predetermined level by mechanism, including an inlet pipe 61, hereinafter to be described. A thermometer 63 mounted on the front wall 14 indicates the temperature of the water.

The top of each urn supports a large wire basket 54 for holding a filter 60 and a charge of ground coffee 62, FIGS. 6 and 7. This basket 54 comprises a tapered body of stainless steel of crossed round wires 64, of heavy stock that is open at the top. The tapered wire body is removably seated at the corner joint 56 between the slanting wall portion 50 and the side wall 42 of the urn. The basket is provided with two handles 58 for ready removal thereof. A large paper lining constituting a fluted filter cup 60 of the same general shape as the basket 54 is removably positioned inside the basket and can be thrown away after one use. The filter extends slightly above the top of the basket as shown in FIG. 7. The side wall of the filter is creased or corrugated. The lining holds the charge of ground coffee 62 loaded to the level of one to two inches in normal use. The open wire work provides free draining support means for the ground coffee. The heated water W in the tank 23 is supplied to the charge of ground coffee 62 in the filter 60 by mechanism presently to be described.

A water pump assembly 65 is suitably supported in the end auxiliary casing 38 and includes a pump 65' with an inlet pipe 66 and an outlet pipe 68. Inlet pipe 66 has its other end connected to an outlet 70 in the water tank end wall 22 of the main casing. The outlet pipe 68 is connected to an inlet 74 in the end wall 22 and to a standpipe 76 extending horizontally and ten vertically inside the main casing and outwardly through the top wall 18 at a point adjacent the rear wall 15. An elbow joint 78 joins the top of the pipe 76 with one end of a horizontally disposed pipe 80 extending parallel to the top wall 18, FIGS. 1, 4 and 8. The other end of pipe 80 is formed integrally with a pivot joint casting 82. An elbow 84 connects the pivot joint casting to an elongated horizontally-disposed laterally swingable pipe arm 86 extending forwardly between the tank openings 24 and 26. Pipe 86 is bent upwardly intermediate its ends as indicated at 88, FIG. 4, positioning the end 90 thereof offset from the plane of the body of the pipe. A water spray head 92 is fixed on the extremity of the offset end 90 of the pipe. A handle 94 radiates from the spray head 92 forming a continuation of the pipe for manipulating the positioning of the spray head. The pipe 86 constitutes an arm and with the spray head swings in a horizontal plane from one opening in the top wall 18 to the other opening as illustrated by the arrows in FIG. 8. A notch 95 in the edge of the flange 51 of the cover provides a clearance for the pipe 86. The pipe and spray head swing in an arc over the cup-shaped cover 36 in the top wall 18 at the front thereof.

The pivotal point casting 82 has a tubular body 96 open at both ends. Inside the tubular body 96 and extending longitudinally thereof is a tubular member 98, protruding from the top and bottom thereof. The bottom end of the tubular member is opened and fixed in the elbow 84 and rotates in the body upon movement of the pipe arm 86. The tubular member 98 is formed with a pair of angularly-spaced inlet holes 100 and 102, either of which is adapted to register with the bore 80' in pipe 80 upon turning of the tubular member 98 to bring the respective hole into register therewith. The top of the tubular member 98 is closed and formed with a solid extension 106 extending upwardly through the open top of the casting body 96, FIG. 4. A nut 108 and washers 110 fasten the extension to the casting and adjust the tension but permit turning of the tubular element 98.

The pump housing 65' is operatively connected to an electric motor 112. The pump sucks the hot water W out of tank 23 and forces it out through the outlet pipe 68 into the standpipe 76 and to the pipe 86 and spray head 92.

A pilot light 113 projects from the front wall of the auxiliary casing 38 and is connected to the pump 65 by conductors 115 and 117, FIGS. 1 and 11. This pilot light signals when the pump is working.

A water level switching device S shown in detail in FIG. 9 is mounted in the main casing adjacent the end wall 22 and rear wall 15. This device S includes a tubular fitting 126 in a hole 128 in the end wall 22 supporting a pipe 130. The inner end of pipe 130 is connected to an elbow 132 which in turn is connected to an upright tubular stem 134. A hermetically-sealed magnetic switch is mounted in the stem 134 and includes flexible flat strip contacts 136 and 138, the ends of which normally overlap and closely spaced from each other. The stem 134 extends loosely through the axial bore 140 of a float 142. The body of the float is formed with a concentrically-arranged recess 144 and mounted in the recess is a permanent magnet 146. A retaining ring 148 of magnetic material is seated on the top edge of the permanent magnet and is flush with the top surface of the body of the float.

An annular flange 150 around the top of the stem limits the upward movement of the float upon the stem, and a nut 152 around the bottom of the stem limits the downward movement theerof. Electrical wire conductors 154 and 156 are connected to the normally open contacts 136 and 138, respectively.

The float 142 is normally in uppermost position as shown in FIG. 9 so that the permanent magnet 144 is above the overlapping ends of the contacts 136 and 138 and has no influence on such ends. The ends are normally in engagement with each other thereby closing the circuit through the solenoid valve 120. When the water in the tank 23 falls, the float 142 drops carrying the magnet 144 downward around the overlapping ends of the contact whereby the magnet draws the ends of the contacts 136 and 138 out of engagement with each other opening the circuit through the solenoid valve 120 and opening said solenoid valve 120. When the solenoid valve 120 is open the water is forced into the tank 23. Entrance of the cold water into the tank 23 causes operation of the thermostat 52. When the water rises and the contacts 136 and 138 come into contact with each other, the circui through the solenoid valve 120 is closed and the valve closes. After the temperature of the water in the tank raises, the circuit through the thermostat 53 closes.

The electrical circuits through the various instrumentalities are substantially completed when the prongs 168 are inserted into the socket of a source of electric motive power such as indicated at 167 in FIG. 11. It is only necessary then to actuate the respective switches.

With particular reference to FIG. 11 showing a wiring diagram, the source of electric motive power 167 may constitute a pair of power wires 169 and 171. A fuse 173 is interposed in line 169. A terminal block 170 is shown mounting a plurality of pairs of terminals indicated from "1" to "10," the individual terminals of the pairs on the right-hand side of the block being connected to line 169, and the individual terminals of the pairs on the left-hand side of the block being connected to line 171. Line 169 is connected to terminal "1" on the terminal block 170. The time-delay starting set switch 124 is connected to line 169 through terminal "2" by wire 160 and is connected to the terminal "3" by wire 162. Timer 122 is connected to the line 169 through terminal "3" by wire 178 and to terminal "4" by wire 176. Thermostat 53 is connected to the line 169 through terminal "4" by wire 186 and to terminal "5" by wire 188. Pilot light 113 is connected to line 169 through terminal "6" by wire 115 and to the pump 65 by wire 117. Pump 65 is connected to line 169 through terminal "6" by line 182 and through terminal "7" by line 182. Solenoid valve 122 is connected to line 169 through terminal "8" by wire 184 and through terminal "9" by wire 186 and to level control device 142 by line 154. Level control device 142 is connected to line 169 through terminal "10" by line 156.

A relay device 190 is electrically connected to certain of the terminals on the left-hand side of the terminal block 170. The terminal 191 of the relay device is connected to terminal "7" by wire 192; the terminal 193 to terminal "4" by wire 194; the terminals 195 and 195' to terminal "3" by wire 196; the terminals 197 and 197' to terminal "2" by wire 198. Terminals "1" and "10" are connected by a wire 200, and terminal "2" is connected to wire 200 by wire 202. Terminals "5" and "8" are connected by wire 204 and terminal "6" is connected to wire 204 by wire 206.

In order to start the operation of the brewing apparatus after a coffee batch 62 has been placed in the large paper filter 60, the plug 166 is inserted into the socket of the 208–240 volt, alternating current source indicated at 167 in FIG. 10. When starting, switch 124 is actuated starting the operation of the timer 122 which controls the circuit through the pump motor 112 so that the pump 65' starts operating and the light 113 lights up to indicate that the coffee urn is in operation. The water will flow through the upright pipe 76, pipe arm 86 and spray head 92 onto the ground coffee in the filter 60 and will extract the coffee flavor from the coffee, the brewed coffee then trickling down through the porous paper filter 60, through the basket 54 and into the urn 40 to be collected therein as brewed or beverage coffee. The indicating light 113 will go out when the timing cycle is complete. The brewed coffee in the urn 40 is kept heated by the water W in the tank 23 until it is withdrawn by the faucet 47.

Either one of the urns 40 may be supplied with water W by merely removing the cover over the respective opening in the top wall 18 and manually swinging the pipe arm 86 by means of the handle 94 to bring the spray head 92 over the opening and to register either the opening 100 or 102 in the tubular member 98 with the axial bore in the pipe 80. The cover may then be replaced over the opening. The pipe arm 86 may also be swung so that the spray head 92 is positioned over the cup-shaped cover 36 to permit the water to drip back through hole 37 into the tank. A faucet 210 may be provided in the front wall 14 adjacent the bottom thereof for draining out the water contents of the tank 23.

It will now be apparent that there has been provided a coffee brewing apparatus wherein the arrangement is wholly automatic in respect to the actual brewing of the coffee in that it eliminates personal judgment as to the time element involved and in respect to the quantity and rate at which water is passed through the coffee charge, these factors being wholly automatic.

It will also be apparent that there has been provided a brewing apparatus that has a constant supply of hot water on hand at all times available for the brewing of the coffee, and that this hot water surrounds the coffee urns to keep the coffee always hot.

It should also be seen that brewing apparatus of the large urn type has been provided in which a throw-away paper filter is used and thereby bringing the paper filter principle into use with these large urns.

While we have illustrated and described the preferred embodiment of our invention, it is to be understood that we do not limit ourselves to the precise construction herein disclosed and that various changes and modifications may be made within the scope of the invention as defined in the appended claim.

Having thus described our invention, what we claim as new, and desire to secure by United States Letters Patent is:

In an automatic coffee brewing apparatus, a tank, a pair of open hollow spaced cylindrical urns in the tank, a removable wire basket in the top of each urn, a paper liner constituting a filter in the basket for holding a charge of ground coffee, opposed handles on the basket, a source of supply of hot water including a stand-up pipe, a spray device adapted selectively to be positioned above the open top of either of said urns, said device including an arm pipe, a spray head at the free end of the arm pipe, a radial handle on the spray head and a pivotal connection between the arm pipe and stand-up pipe, a pipe connecting the pivoted arm pipe and the source of supply of hot water, a pump associated with the last-named pipe for forcing a quantity of hot water into the ground coffee in either urn in order to extract the flavor from the coffee, a manually adjustable timer associated with the pump for determining a selected quantity of water to be pumped into the urn, an outlet pipe in each urn, a faucet connected to the other end of the outlet pipe for withdrawing the brewed coffee from the urn, a glass gauge associated with each urn for indicating the level of the brewed coffee therein, a conduit between the outlet pipe of each urn and its respective glass gauge, a solenoid controlled valve for controlling passage of cold water into the tank, and an automatically actuated float device in the tank for activating the solenoid valve to close the valve when the level of water in the tank rises to a predetermined level and to open the valve when the level of water falls to a predetermined level, said automatically actuated float device including a hollow stem supported upright in the tank, immersed in the water, a hermetically sealed magnetic switch inside said hollow stem and including movable overlapping contacts, a float member movable up and down along said stem and a permanent magnet carried by said float adapted to pull the overlapping contacts away from each other.

References Cited by the Examiner

UNITED STATES PATENTS

| | | | |
|---|---|---|---|
| 1,762,208 | 6/1930 | Aborn | 99—321 X |
| 2,360,194 | 10/1944 | Bright | 99—291 |
| 2,565,235 | 8/1951 | Johnson | 99—282 |
| 2,748,689 | 6/1956 | Rotman | 99—283 X |
| 3,085,880 | 4/1963 | Matty | 99—283 X |
| 3,149,556 | 9/1964 | Martin | 99—291 |
| 3,194,147 | 7/1965 | Cowley | 99—283 |

FOREIGN PATENTS 479,368  2/1938  Great Britain.

WALTER A. SCHEEL, *Primary Examiner.*

IRVING BUNEVICH, *Examiner.*

STANLEY P. FISHER, *Assistant Examiner.*